United States Patent Office 2,961,078
Patented Nov. 22, 1960

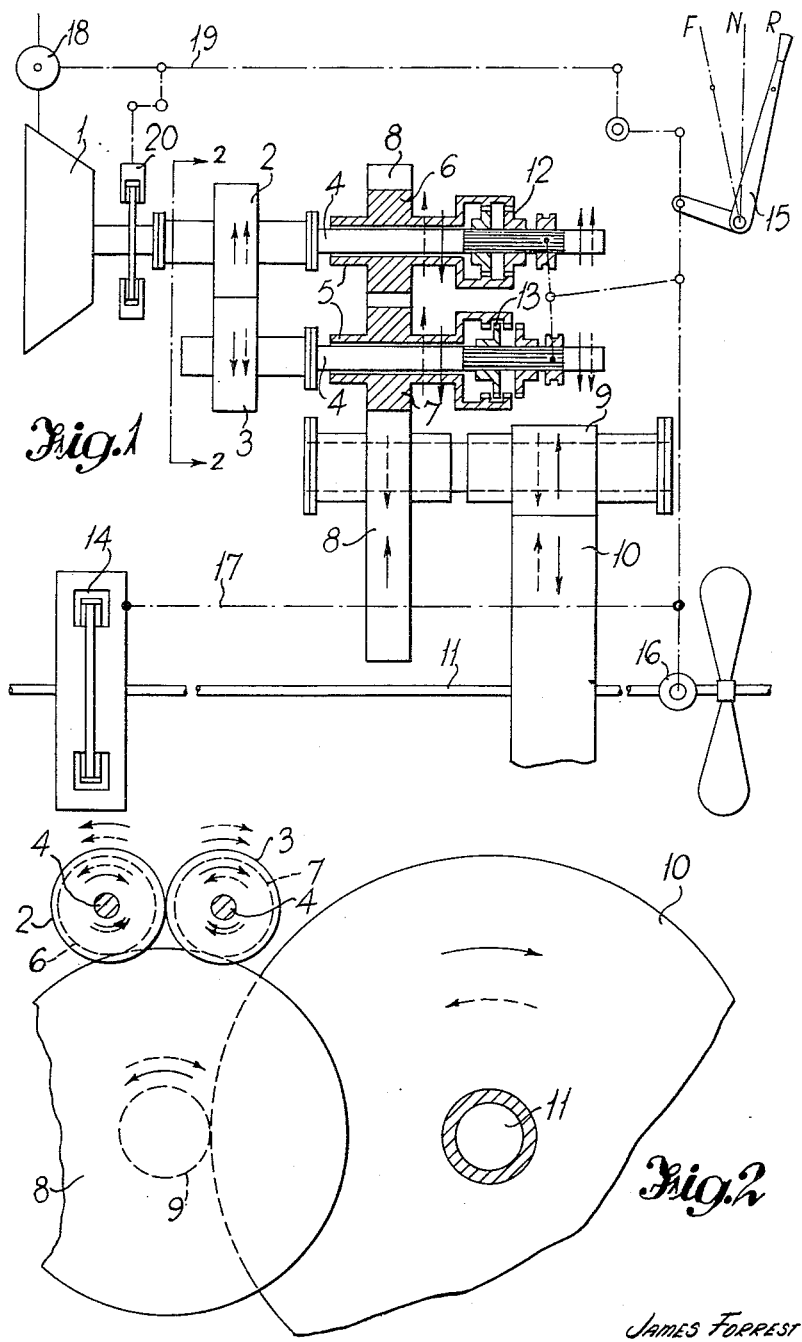

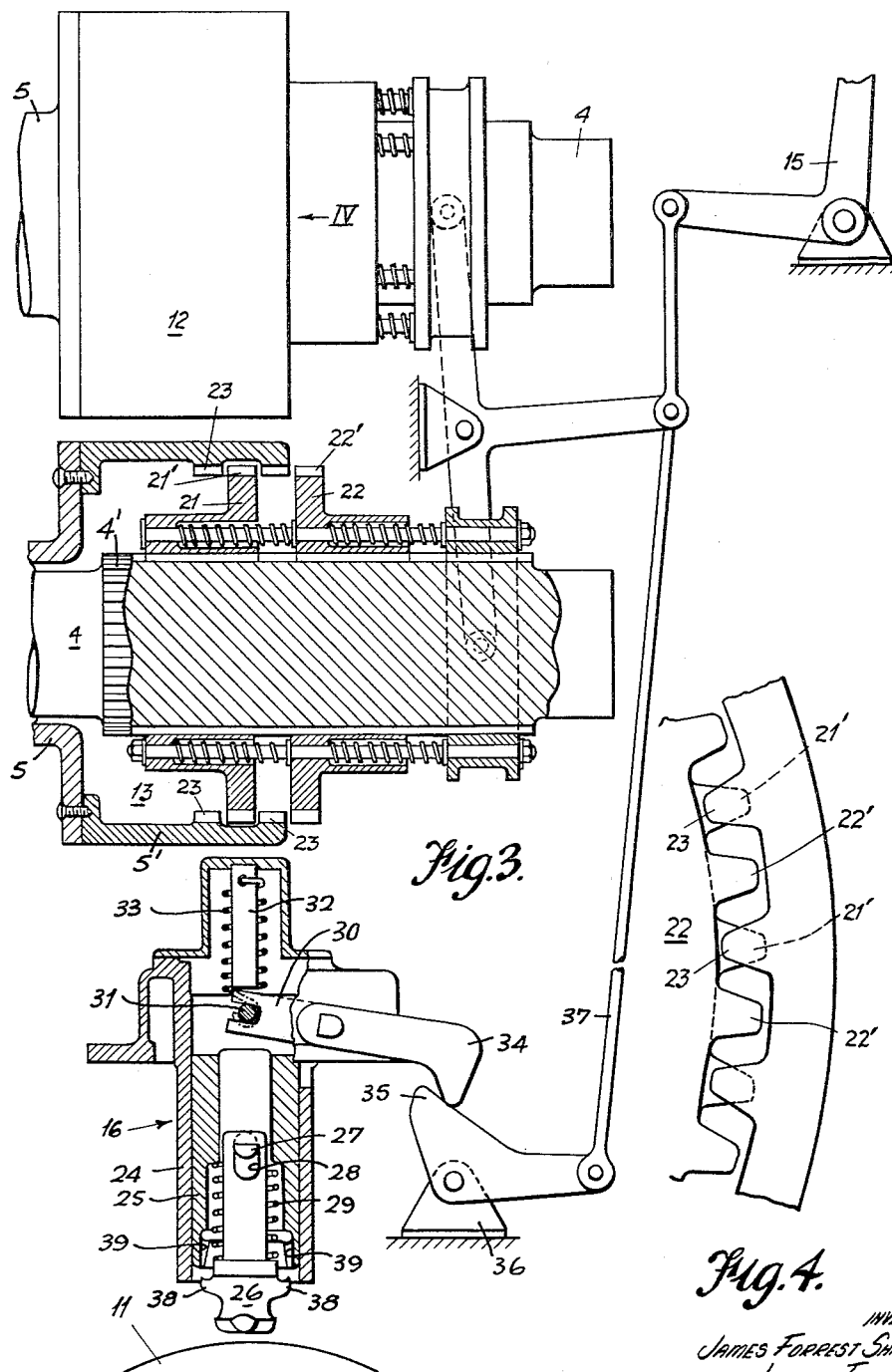

2,961,078

REVERSING GEAR FOR UNIDIRECTIONAL GAS TURBINE DRIVES

James Forrest Shannon, Bowdon, and James Fulton, Stretford, England, assignors to Metropolitan Vickers Electrical Company Limited, London, England, a British company Filed Mar. 23, 1959, Ser. No. 801,375

Claims priority, application Great Britain Apr. 23, 1958

7 Claims. (Cl. 192—4)

This invention relates to power plants which are driven by a steam or gas turbine wherein it is desirable to be able to reverse the direction of rotation of the output shaft through a reduction gearing. Such power plants are of particular advantage for marine propulsion equipment although the invention may be equally advantageous for other fields of application where similar conditions obtain.

A reversing drive according to the invention comprises a pair of intermeshing gear wheels one of which is coupled to a turbine to be driven thereby, a pair of pinions in mesh with a common gear wheel connected to an output shaft, a pair of clutches each comprising driving and driven members coupled respectively to one of the gear wheels and one of the pinions, operating mechanism arranged for selectively engaging the driven and driving members of one clutch and disengaging the members of the other clutch whereby the rotation of the common gear wheel may be reversed, a brake on the output shaft connected to the operating mechanism for applying a stopping torque to the shaft, and a run-detector associated with the output shaft and the operating mechanism for ensuring that the clutches can be engaged or disengaged only when the output shaft is stationary.

If the steam or gas supply to the power turbine can not be completely shut off, there will be a residual torque between the turbine and the stopped propeller shaft which will resist clutch disengagement. In such circumstances it is advantageous to fit an auxiliary holding brake on the input shaft of the turbine, and to arrange that this auxiliary brake be turned backwards to release the residual torque and to permit easy withdrawal of the engaged clutch.

This auxiliary brake can advantageously hold the power turbine when the two clutches are in "neutral" position.

In a preferred embodiment of the invention, the two pinions are mounted on quill shafts and are freely rotatable on shafts coupled to, or forming extensions of, the intermeshing gear wheel shafts; the clutches are located on the side of the pinions remote from the gear wheels with the driven members on the quill shafts and the driving members on the gear wheel shafts.

The invention will now be described referring to the drawings filed with this specification which illustrate diagrammatically in Fig. 1 a plan view and in Fig. 2 an end view on the line 2—2 of Fig. 1 of a gearing layout suitable for marine propulsion; Fig. 3 is an enlarged detail view, partly in section, of a preferred form of clutch and a "run-detector" mechanism linked thereto; and Fig. 4 is an end view, on a still larger scale, of some of the clutch teeth viewed along the arrow IV of Fig. 3. In the drawings the various elements are shown for astern operation to suit a left handed propeller; the direction of rotation of the shafts and wheels active for ahead operation is shown by full arrows, the broken arrows indicating those active for astern operation.

The reference numeral 1 represents a gas turbine which is coupled to a gear wheel 2 intermeshing with a gear wheel 3 of the same diameter and rotating in the opposite sense. The wheels 2, 3 are coupled to shafts 4 which pass through quill shafts 5 carrying pinions 6, 7 which are both in mesh with an intermediate gear wheel 8. The pinions 6, 7 are freely rotatable relative to the shafts 4. The gear wheel 8 is made compound with, or coupled to, a main pinion 9 which is in mesh with a slow speed wheel 10 keyed on an output propeller shaft 11.

The right hand ends of the shafts 4 are connected to the driving members of clutches 12, 13, the driven members being connected to the quill shafts 5. These clutches are of the direct-entry type and in the preferred embodiment are constructed as fully described in United States Serial No. 731.925. Briefly described this construction consists, as shown in Fig. 3, of two separate toothed members 21, 22 which are axially slidable on straight splines 4' on shaft 4 into or out of engagement with co-operating rings of teeth 23 on a third member 5' which is fixed axially to quill shaft 5. The two sliding members have alternate teeth omitted and are spaced angularly by one tooth pitch relative to each other, so that when viewed axially (Fig. 4) the teeth 21' of one member lie between the teeth 22' of the other. The fixed member also has alternate teeth omitted but the teeth of each ring 23 are in alignment, which ensures that one or other of the sliding members will enter at any arbitrary position of the fixed and sliding members. When rotation takes place with one sliding member engaged, the teeth of this member and of the fixed member are in contact and the other sliding member can then enter so that the coupling is locked with little or no backlash.

The clutches 12, 13 are so interconnected that only one of them can be engaged at a time. Mechanism including a hand lever 15 movable between "ahead" position F, "neutral" position N, and "astern" position R, is provided for operating the clutches. The lever 15 is operatively connected through linkage schematically shown by the dotted line 17 to a disc brake 14 whereby the shaft 11 may be stopped and brought to rest. The brake 14 may be situated at any convenient position on the output shaft and is of suitable proportions to cater for all the inertia of the rotating system. According to the magnitude of the stopping torques required one or more brakes may be used. The clutch operating mechanism is further interlocked to the shaft 11 through a "run-detector" device 16 of known type, which prevents full movement of the operating linkage and thus engagement of the clutches before the shaft comes to rest.

A suitable device for this purpose is shown in the lower part of Fig. 3, which illustrates a "run-detector" 16 and a portion of the main shaft 11. This device 16 comprises an outer casing having a cylinder portion 24 with a sleeve 25 slidably mounted therein. A pendulum 26 is suspended on a pivot 27 within sleeve 25 and is free to swing from side to side to a limited extent. The pendulum is slotted at 28 providing a lost motion connection which permits of relative vertical movement with respect to sleeve 25, and a loading spring 29 biases the pendulum towards shaft 11. Sleeve 25 can be lowered or raised by the operating lever 15 through the medium of a crank 30 which engages a pin 31 in the upper part of the sleeve, upward movement being limited by a stop 32 mounted at the upper part of the outer casing in the path of crank 30. A return tension spring 33 is anchored to pin 31 so as to lift the pendulum away from shaft 11 when either of clutches 12, 13 is disengaged. Crank 30 is operated by an arm 34 which bears on a two-way cam 35, pivoted in a fixed bracket 36 and connected to lever 15 through appropriate linkage 37. The arrangement is such that, when sleeve 25 is lowered by operation of lever 15 acting through cam 35 and arm 34, the base of pendulum 26 is brought into contact with shaft 11; if the latter is rotating the pendulum is brushed to one side or the other of the sleeve thereby causing the travel of the sleeve to be restricted by projections 38 formed on the pendulum engaging the end of the sleeve. If however the shaft is stationary, the pendulum on contact with the surface thereof remains vertical and the sleeve can be moved to its lowest position, clearance 39 being provided at either side for this purpose and pivot 27 moving down in slot 28. Operating lever 15 can therefore be moved through its full travel when shaft 11 is stationary.

A throttle valve 18 for the gas supply to the turbine is controlled by lever 15 through appropriate linkage 19 which further controls an auxiliary brake 20 on the turbine shaft.

It will be appreciated that, as the gear wheels 2, 3 are always in mesh, they rotate in opposite directions and that therefore, by engaging the appropriate clutch 12 or 13, pinion 6 or 7 may be made to rotate the wheel 8 and hence the output shaft in the direction desired.

In operation, if the ship is moving astern with the various elements in the positions shown with wheel 3 and pinion 7 idling, and it is desired to reverse direction and to go ahead, the operating lever 15 will be moved over from "astern" position R to "ahead" position F. This will result in a series of operations as follows:

(1) The gas generator is throttled back to idling, thus unloading the gas turbine 1.

(2) The propeller disc brake 14 is applied, bringing the propeller shaft 11 and the power turbine 1 to rest; the auxiliary brake 20 is applied when the shafts are stopped.

(3) When the propeller has completely stopped rotating, the "run-detector" 16 permits the astern clutch 12 to be disengaged and the ahead clutch 13 to be engaged. The auxiliary brake 20 is then released.

(4) Following this the propeller disc brakes are released leaving the propeller shaft free to rotate.

(5) The gas generator throttle is opened, supplying power to the gas turbine which will begin to turn the propeller in the ahead direction through clutch 13 and pinion 7, the pinion 6 now idling.

To return to astern running from ahead running the operating sequence would be the same as above, except that in operation stage 3 the ahead clutch 13 would be disengaged and the astern clutch 12 would be engaged.

Amongst other advantages which the invention offers are those of a simple arrangement by which ship manoeuvring may be controlled by a single operating lever, economy of space and overall weight with low initial cost, and straight-forward maintenance. As already stated the invention is not however limited to marine propulsion and constructional modifications may be made without departing from the invention; for example the brake 14 need not be a disc brake.

The arrangement illustrated reduces the number of idling components when going ahead, the ahead drive being taken through gear wheels 2 and 3, and pinion 7, leaving pinion 6 as the only idling member. This is desirable in marine work as ahead running occupies most of a ship's travelling time.

With a twin screw arrangement, the turbines and gears can be similar, the opposite rotation of the propeller being accommodated by the choice of coupling.

It may also be arranged to provide a "neutral" position N for the lever 15 in which both clutches are disengaged. This would permit the power turbine 1 to be rotated by a turning gear in known manner in order to ensure uniform rotor temperature, without rotation of the propeller. The use of the auxiliary brake 20 on the turbine shaft also ensures that there is no movement of the gear train during the passage through the neutral position when changing from one direction to the other.

By the invention, in the steam marine installations only one turbine need be provided instead of separate ahead and astern turbines as customarily employed.

What we claim is:

1. In a turbine driven powerplant, a reversing drive comprising a pair of intermeshing gear wheels, one of said gear wheels being coupled to a turbine shaft to be driven thereby, an output shaft, a pair of pinions each in mesh with a common gear wheel, means connecting said shaft to said last mentioned gear wheel to be driven thereby, a pair of clutches each comprising driving and driven members coupled respectively to one of said gear wheels and one of said pinions, operating mechanism for selectively engaging the said driven and driving members of one of the clutches and disengaging the said members of the other clutch whereby the direction of rotation of said common gear wheel may be reversed, a brake on said output shaft connected to said operating mechanism for applying a stopping torque to said shaft, and a run-detector associated with said shaft and said mechanism for ensuring that said clutches can be engaged or disengaged only at such time when said shaft is stationary.

2. In a turbine driven power plant a reversing drive as claimed in claim 1, in which an auxiliary holding brake is mounted on the said turbine shaft and is operatively connected through appropriate linkage to clutch operating mechanism whereby the said shaft and gear train may be held stationary when changing the driving connection from one clutch to the other.

3. In a turbine driven power plant a reversing drive as claimed in claim 2, in which a throttle valve operatively connected to said clutch operating mechanism is provided for controlling the flow of driving fluid from a source of supply to said turbine.

4. In a turbine driven power plant a reversing drive comprising a shaft carrying a gear wheel coupled to the turbine shaft, a clutch shaft coupled to said gear wheel shaft, a quill shaft rotatably mounted on said clutch shaft, said quill shaft having a pinion fixed thereon, a second clutch shaft fixed to a second gear wheel intermeshing with said first gear wheel, said gear wheels being of the same diameter, a second quill shaft rotatable on said second clutch shaft and having a second pinion fixed thereon, a pair of clutches each comprising a driving member and a driven member, said driven members being secured to respective ones of said quill shafts and said driving members being mounted respectively on one of said clutch shafts in axially slidable relation to said fixed members, operating means for moving said driving members selectively into and out of engagement with said driven members, a common gear wheel engaged by said pinions, an output shaft, a gear train connected between said wear wheel and said output shaft, a brake on said output shaft for applying a stopping torque thereto, a single lever having forward, neutral and reverse positions for controlling said clutch operating means and said brake, and a run-detector operatively associated with said output shaft and said lever for ensuring that said clutches can be engaged or disengaged only when said output shaft is stationary.

5. The invention of claim 4 wherein the clutches each consist of two separate toothed members which are axially slidable on straight splines on the clutch shaft into and out of engagement with corresponding teeth on a third axially fixed member, said toothed members having alternate teeth omitted and said two sliding members being spaced angularly by one tooth pitch relative to each other, so that when viewed axially the teeth of one member lie between the teeth of the other member.

6. The invention of claim 5 in which an auxiliary holding brake is mounted on the turbine shaft and is operatively connected through appropriate linkage to the clutch operating mechanism whereby the said shaft and gear train may be held stationary when changing the driving connection from one clutch to the other.

7. The invention of claim 6 in which a throttle valve operatively connected to said clutch operating mechanism is provided for controlling the flow of driving fluid from a source of supply to said turbine.

References Cited in the file of this patent

UNITED STATES PATENTS

| | | |
|---|---|---|
| 1,662,301 | Coykendall | Mar. 13, 1928 |
| 2,469,743 | Newton | May 10, 1949 |
| 2,762,230 | Meyer | Sept. 11, 1956 |
| 2,842,975 | Meyer et al. | July 15, 1958 |